United States Patent [19]

Ernst et al.

[11] Patent Number: 5,013,206
[45] Date of Patent: May 7, 1991

[54] GUIDE MOUNTED BOAT TRAILER

[76] Inventors: Guenter Ernst, 3999 Morning Star Dr., Salt Lake City, Utah 84124; Steven S. Davis, 298 S. Cobble Creek Rd., Farmington, Utah 84025

[21] Appl. No.: 296,720
[22] Filed: Jan. 12, 1989
[51] Int. Cl.⁵ .......................... B60P 1/28; B60P 3/10
[52] U.S. Cl. ............................ 414/483; 280/414.1; 114/344
[58] Field of Search ............... 414/480, 482, 483, 484, 414/486, 451, 494, 498, 500, 509, 510, 514; 280/414.1; 114/344

[56] References Cited

U.S. PATENT DOCUMENTS

| | | | |
|---|---|---|---|
| 2,371,461 | 3/1945 | Newell | 114/344 X |
| 3,149,735 | 9/1964 | Bleecker | 414/506 |
| 3,547,285 | 12/1970 | Plummer . | |
| 3,608,754 | 9/1971 | Park | 114/344 X |
| 3,632,138 | 1/1972 | Whiteley, Jr. . | |
| 3,656,639 | 4/1972 | Lothen . | |
| 3,682,335 | 8/1972 | Smyth | 414/506 |
| 3,826,391 | 7/1974 | Prince . | |
| 3,856,168 | 12/1974 | Mauck . | |
| 3,951,433 | 4/1976 | Starkey | 280/414.1 |
| 3,963,263 | 6/1976 | Whitlock | 280/414.1 |
| 3,989,267 | 11/1976 | Robinson | 280/414.1 |
| 4,099,279 | 7/1978 | Park | 414/482 X |
| 4,114,772 | 9/1978 | Beelow . | |
| 4,114,920 | 9/1978 | Boettcher | 280/414.1 |
| 4,133,577 | 1/1979 | Pilant . | |
| 4,209,279 | 6/1980 | Aasen | 414/534 |
| 4,211,513 | 7/1980 | Hosie . | |
| 4,268,212 | 5/1981 | Weary . | |
| 4,365,923 | 12/1982 | Lubbers . | |
| 4,395,185 | 7/1983 | Whaley | 414/483 X |
| 4,463,965 | 8/1984 | Lawson | 280/414.1 |
| 4,464,092 | 8/1984 | Chambers et al. . | |
| 4,623,161 | 11/1986 | Sprague . | |
| 4,641,851 | 2/1987 | Knies | 280/414.1 |
| 4,679,812 | 7/1987 | Byrnes . | |
| 4,681,334 | 7/1987 | O'Brien, Jr. . | |

Primary Examiner—David A. Bucci
Assistant Examiner—Robert S. Katz
Attorney, Agent, or Firm—Trask, Britt & Rossa

[57] ABSTRACT

A boat trailer is disclosed, having a rigid frame, a guide member adapted for guiding a boat being loaded onto or launched from the trailer, and buoyant members for elevating the guide member to an altitude proximate a surface level of a body of water into which the trailer has been driven. The trailer may include a subframe pivotally mounted to the main frame. The guide member, which may be a pair of cables trained over a plurality of upright stanchions mounted on the frame, defines a "V"-shaped channel dimensioned to receive and guide a boat. The subframe may be fitted with low density material blocks which upon being placed in water effect a hydrostatically-induced, buoyant force against the subframe causing that subframe to rise as it pivots about its frame mounting. The trailer is adapted for forming an automatic connection with an incoming boat and further, for automatically uncoupling itself from a boat being launched. The trailer is thereby suited for one-man loading and launching operations.

10 Claims, 14 Drawing Sheets

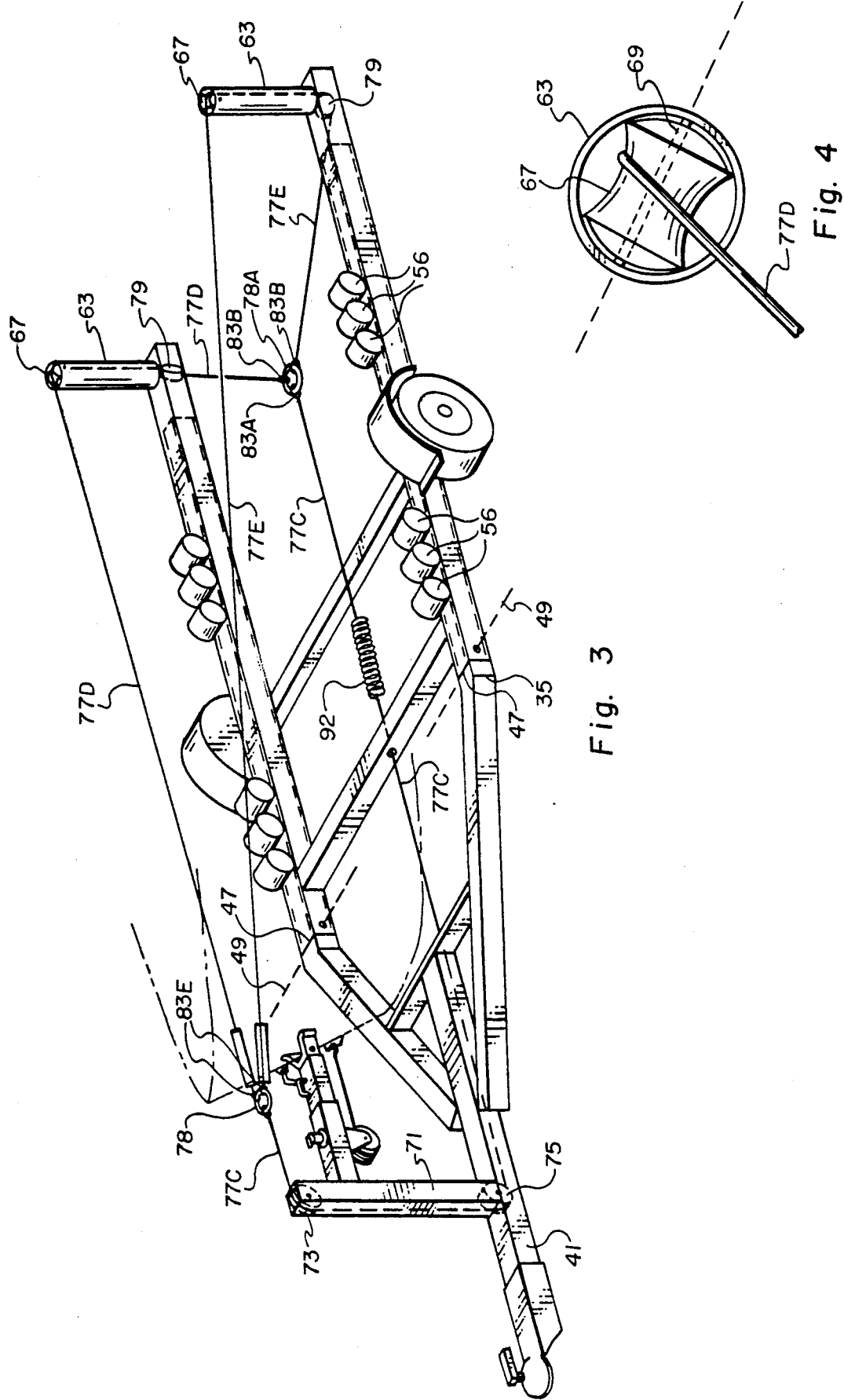

GUIDE MOUNTED BOAT TRAILER

BACKGROUND OF THE INVENTION

1. Field

This invention relates to trailers of various configurations. More particularly, the invention is directed to trailers adapted for retrieving and transporting marine vehicles, such as boats, across land and thereafter launching those vehicles into a body of water.

2. State of the Art

In the last several decades, public interest in boating as a recreational activity has increased markedly. Boats capable of carrying a small number of passengers have become an affordable expenditure for many families. As the number of boats has increased, the limited number of docks and permanent moorings have been overtaxed and have proven inadequate in providing on-water storage facilities for many of the new boats. Those boat owners unable to find or afford permanent mooring space have found it necessary to remove their boats from the water and transport them over land to storage facilities. Many boat owners have found it desirable to be able to transport their boats over land from one body of water to another, thereby increasing the number of aquatic environments that can be enjoyed.

These transport activities have created a need for trailer-like structures adapted for retrieving a boat from a first body of water, loading that boat on the trailer structure and thereafter transporting the boat over land. Further, these trailers should be adapted for launching a boat into a second body of water.

Various innovative efforts in designing boat-carrying trailers have yielded structures which have addressed several of the problems inherent in retrieving, loading, transporting and launching marine-type vehicles. Among these structures are the following:

U.S. Pat. No. 3,547,285 (Plummer) discloses an elongate trailer having a pair of oppositely positioned guides affixed on the end thereof. Pivotedly mounted to the frame, the guides are biased one toward another to permit an incoming boat to pass therebetween. The guides act as a means of aligning the boat to facilitate a placement thereof on the trailer frame during a floatation-assisted landing.

U.S. Pat. No. 3,632,138 (Whiteley) discloses a boat trailer having a pair of spacedly positioned, longitudinally extending, parallelly arranged guide rails. The guide rails are positioned and configured to guide an incoming water-borne boat onto the trailer. A fixed bow centering guide positioned at the forward end of the trailer also assists in aligning the incoming boat.

U.S. Pat. No. 3,656,639 (Lothen) discloses a conventional boat trailer having a pair of narrow, parallel elongate tracks longitudinally and centrally positioned thereon. The tracks include a small, bow-supporting carriage which coacts with side-placed conventional stationary rollers to facilitate the loading and launching of a boat.

U.S. Pat. No. 3,826,391 (Prince) illustrates a boat trailer having telescoping frames. One of the frames is articulated for movement, allowing that frame to follow the contour of a launching ramp.

U.S. Pat. No. 3,856,168 (Mauck) discloses a conventional boat trailer having two pairs of elongate, parallelly positioned, longitudinally arranged tracks. A plurality of carriages, each having a plurality of rotatably mounted wheels which engage with a respective pair of tracks, are adapted to be displaced longitudinally along the tracks to either unload or receive a boat.

U.S. Pat. No. 4,114,920 (Boettcher) discloses a fastening assembly adapted for securing a boat to a trailer. The fastening assembly includes a "V-shaped" cradle configuration to engage the opposite sides of the bow of a boat.

U.S. Pat. No. 4,114,772 (Beelow) discloses a trailer for use in transporting pontoon-type boats. A movable framework is mounted on the trailer for use in lowering a boat carried thereon into the water.

U.S. Pat. No. 4,133,577 (Pilant) discloses a trailer adapted for transporting two boats. The trailer may also be utilized to form a framework for a tent-like shelter.

U.S. Pat. No. 4,211,513 (Hosie) discloses a releasable pulley device adapted for releasably detachable mounting on the center rear end of a winch-fitted boat trailer. The pulley is designed to effect an alignment of the prow of an incoming boat with the trailer.

U.S. Pat. No. 4,268,212 (Weary) illustrates a boat trailer having a pair of longitudinally extending, parallel, spacedly positioned tracks and a carriage slidably mounted thereto. The carriage has an upright stanchion mounted thereto configured to abut against a boat loaded on the trailer.

U.S. Pat. No. 4,365,923 (Lubbers) describes a boat trailer having an elongate inner frame adapted to be longitudinally displaced therealong. The motion of the inner frame is controlled by two separate and distinct incline assemblies.

U.S. Pat. No. 4,464,092 (Chambers et al.) discloses a boat trailer having a plurality of position and angle adjustment members configured for transporting a number of different sized boat hulls.

U.S. Pat. No. 4,623,161 (Sprague) discloses a boat trailer having a pair of elongate, parallelly arranged, longitudinally extending side supports in association with a pair of upwardly and outwardly extending dolphins. A "V-shaped" guide bar positioned proximate the forward end of the trailer is positioned to receive the bow of the boat upon its loading on the trailer.

U.S. Pat. No. 4,679,812 (Byrnes) discloses a boat trailer having a carriage mounted thereon for longitudinal displacement along the trailers. The carriage includes a wheel mounted thereon to support the carriage as it is displaced rearwardly along the trailer.

Common to most, if not all, of the above-described structures is the difficulty of guiding a boat onto or off of the trailer. Most loading and launching activities are performed from inclined concrete ramps which lead into a body of water. Due to the height of many conventional boats, the trailer must be submerged in the water in order for the boat to become buoyant and thereafter be unloaded and eased into the water. As a result, oftentimes any structure, fitted to the boat to act as a guide for aligning the boat with the trailer for loading or launching purposes, becomes ineffective due to its fixed mounting to the trailer frame. Since the trailer is often substantially below the water surface during either loading or unloading operations, the guides are sufficiently distanced from the floating boat to become ineffectual in guiding or aligning the boat.

Furthermore, few trailers, if any, provide for a guiding means which continuously aligns the boat as it either enters or leaves the trailer. Most of the prior trailers include guides which are positioned at spaced intervals along the trailer frame and thereby function to provide an intermittent guide function as opposed to a guide which receives the boat at the end of the trailer and continuously guides the boat to its ultimate resting position on the trailer.

Many trailers require the working efforts of a multiple number of individuals in order to properly load or unload a boat. Typically, one individual must operate a latch and winch mechanism mounted on the trailer, while a second individual stands at the controls of the boat. Understandably, the requirement of multiple operators makes boating a difficult activity for a single individual.

There continues to be a need for a trailer which permits the loading and unloading of a boat by a single individual. Additionally, there continues to be a need for a trailer which at once provides a guide means capable of operating effectively without regard to the trailer being submerged in water while furthermore providing an aligning means which operates continuously during the boat's loading, i.e., from the moment the boat enters the trailer until the moment the boat reaches its loaded or rest orientation. Further, the guide means preferably should guide the boat continuously in unloading from the beginning of the boat's displacement along the length of the trailer until the boat clears the rearmost end of the trailer.

SUMMARY OF THE INVENTION

A boat trailer having a rigid frame mounted with an axle and ground engaging wheels rotatably mounted thereto includes a guide means associated therewith, which is made extendable upwardly from the frame as the trailer is driven into water.

Various constructions of an elevatable guide means are disclosed.

In one embodiment, a rigid subframe assembly is pivotally mounted to the frame, permitting it to rotate, e.g., in a vertical plane about a horizontally-oriented rotational axis. A plurality of uprightly mounted stanchions are mounted to both the frame and the subframe. At least one cable is trained over the stanchions to define a channel or corridor dimensioned to receive a boat. The cable(s) may be made displaceable, e.g., slidable over the stanchions, whereby the cables progress over their stanchion mountings as the boat is loaded or launched from the trailer. The invention may also provide for a detachable engagement of the cable(s) with the boat.

At least one, but preferably, a plurality of low density material blocks are mounted to the subframe. The number and size of the blocks is adjusted whereby upon the trailer being driven into water, the hydrostatically-induced buoyant forces reacting on the blocks is sufficient to raise the subframe, by pivoting it about its rotational axis, to a location preferably proximate the surface level of the water in which the trailer is located. The invention provides a guide means for loading and launching a boat from a trailer which engages and aligns the boat with the trailer, notwithstanding the fact that the main body of the trailer may be located some distance below the water surface and below the bottom of the incoming boat.

In another embodiment, a plurality of longitudinally extending tracks are mounted to the trailer, providing a pathway for a carriage configured to engage a boat being loaded or unloaded on the trailer. The carriage, being configured to be displaceable along a length of the trailer, includes an abutment plate suited for receiving the bow of a boat and guiding the boat onto or off of the trailer. The abutment plate is fitted with a low density block of material which, upon being placed in water, engenders a hydrostatically-induced buoyant force on the abutment plate, thereby causing that abutment plate to be driven upward into an engagement against a boat positioned above the carriage and frame. This alternative embodiment provides a guide means adapted for engaging and guiding the boat onto or off of the trailer, irrespective of the location of the main frame of the trailer. More specifically, this guide means is adapted for being elevated from a submerged trailer to a location wherein it can engage a boat floating on the water surface.

The invention also embraces a plurality of novel latching means suited for engaging and disengaging the trailer from the boat. This latching means provides a trailer which is operable for loading or unloading a boat by a single individual positioned at the controls of that boat. Further, an abutment means which is structured to provide a cushioned impact of the boat against the trailer upon loading is disclosed.

BRIEF DESCRIPTION OF THE DRAWINGS

FIG. 1A is a cross-sectional elevational view of the trailer taken from the rearmost end.

FIG. 3 is a partial perspective view of a modified embodiment of the trailer shown in FIG. 1.

FIG. 4 is a top view of an end stanchion of the trailer shown in FIG. 3 illustrating a pulley mounted therein.

DETAILED DESCRIPTION OF THE DRAWINGS

Figure 1:
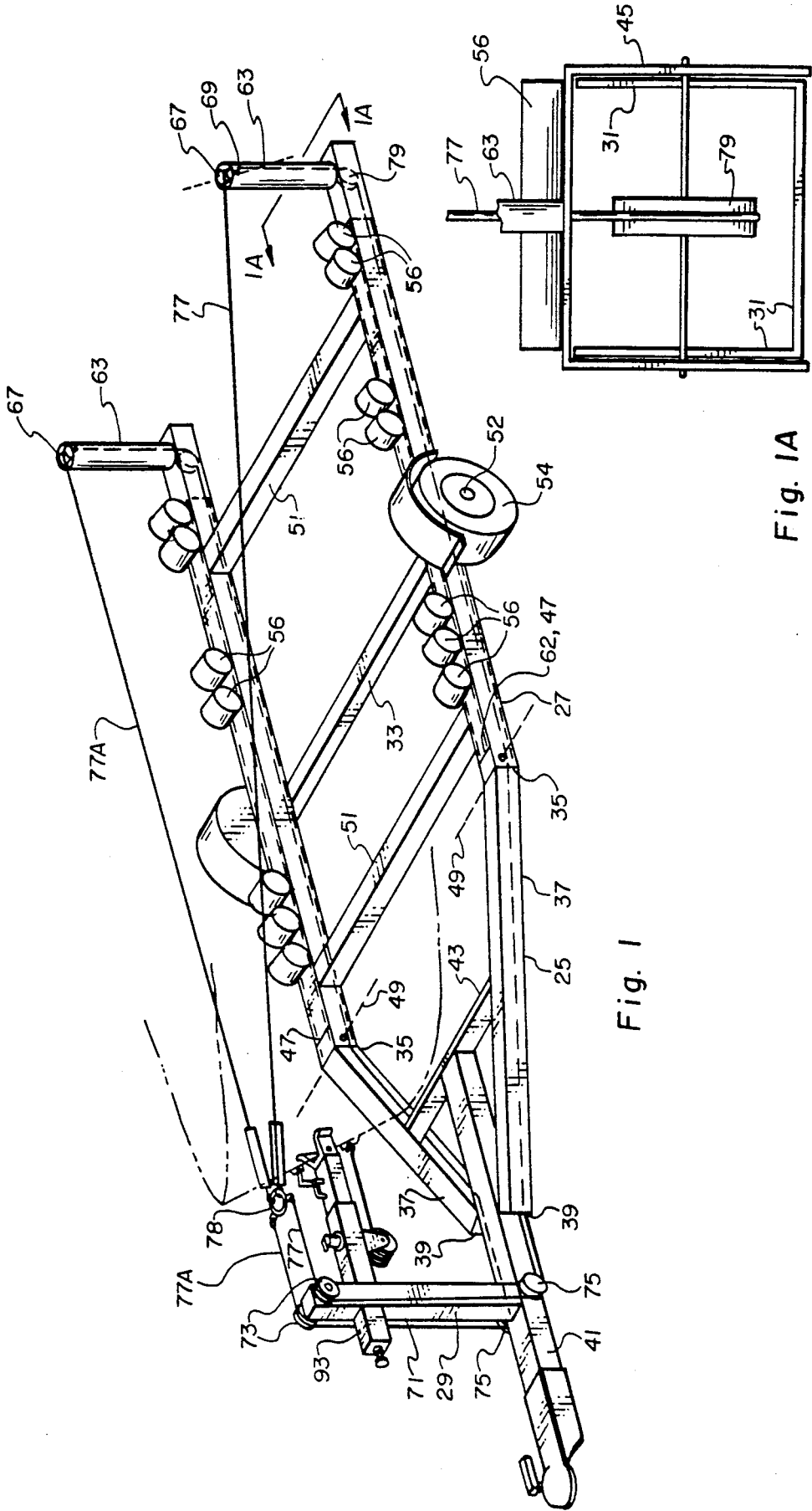
FIG. 1 is an elevational perspective view of a boat trailer of the invention having a cable guide means in association with a hingedly mounted subframe. The boat is shown partially in phantom.

As illustrated in FIG. 1, a boat trailer of this invention includes an elongate rigid frame 25, an elevationally adjustable pivotally mounted subframe 27 and a guide means 29 mounted to subframe 27.

Frame 25 is an elongate arrangement having a first pair of spacedly positioned parallel shafts 31 which are fixedly mounted to a cross-brace 33. As shown in FIG. 1A, shaft 3 may be a "U"-shaped member defining a hollow open-topped channel which extends along the length thereof. The end 35 of each shaft 31 is fixedly mounted with an angulated shaft 37. The shafts 37 may be structurally similar to shafts 31 except they may be quadrilaterally cross-sectioned hollow members. The open ends 39 of each shaft 37 intersect and are mounted to a centrally positioned shaft 41. The shafts 37 are arranged to define a generally "V"-shaped configuration. Shaft 41 may likewise be a hollow quadrilaterally cross-sectioned member. Shafts 31, 37 and 41 are all positioned in the same plane.

A cross member 43 is fixedly mounted to each of the shafts 37 to extend therebetween. Cross member 43 is also fixedly mounted to an end of shaft 41, forming a brace not only for that shaft 41 but also for the shafts 37.

Each pair of shafts 37 and 41 define, in conjunction, an elongate hollow interior channel which extends uninterruptedly through the lengths of the conjoined shafts.

Subframe 27 includes a pair of elongate, parallelly and spacedly positioned, inverted "U"-shaped shafts 45, each of which is rested over and atop a respective frame shaft 31 as shown in FIG. 1A. Each shaft 45 extends outwardly beyond its supporting frame shaft 31 as illustrated in FIG. 1. Each shaft 45 is hingedly mounted to its support shaft 31 at its end 47 by a horizontally oriented, elongate pivot pin which passes through a pair of registered openings in the sidewalls of shaft 31. The hinged mounting permits each shaft 45 to pivot upwardly, i.e., in a vertical plane about its respective horizontal axis 49. As shown, a section of the shaft 45 is cut away proximate its pivot mounted end to form a slot for facilitating the upward rotation of the shaft about its axis 49.

A pair of cross-brace members 51 are each mounted to the shafts 45 to extend therebetween, forming a rigid subframe assembly.

An elongate axle 52 is mounted within cross-brace 33 and is mounted on each of its free ends with a rotatably mounted wheel 54. A suspension system utilizing leaf springs or alternative structure conventionally known in the art may be fitted to the axle/wheel arrangement for associating that arrangement to the frame 25.

Mounted atop each shaft 45 is a plurality of blocks 56 manufactured of a relatively light, low density material such as styrofoam which becomes buoyant upon its placement in water, i.e., its specific gravity is less than one (1.0). Therefore, upon their placement in water, an upwardly directed hydrostatic force is engendered on the blocks. Since the blocks 56 are mounted to shafts 45, this hydrostatic force acts against the shafts 45, rotating the shafts 45 about their respective pivot axes and hence raising the shafts 45. The size and quantity of blocks 56 is determined so as to provide a hydrostatic, buoyancy-created, upwardly directed force of sufficient magnitude to physically raise the free end of shafts 45 to a height preferably proximate the surface level 57 of the water in which the trailer has been driven, assuming that the surface level 57 is within reachable distance from the location of the frame 25 on the ramp 58.

Figure 2:
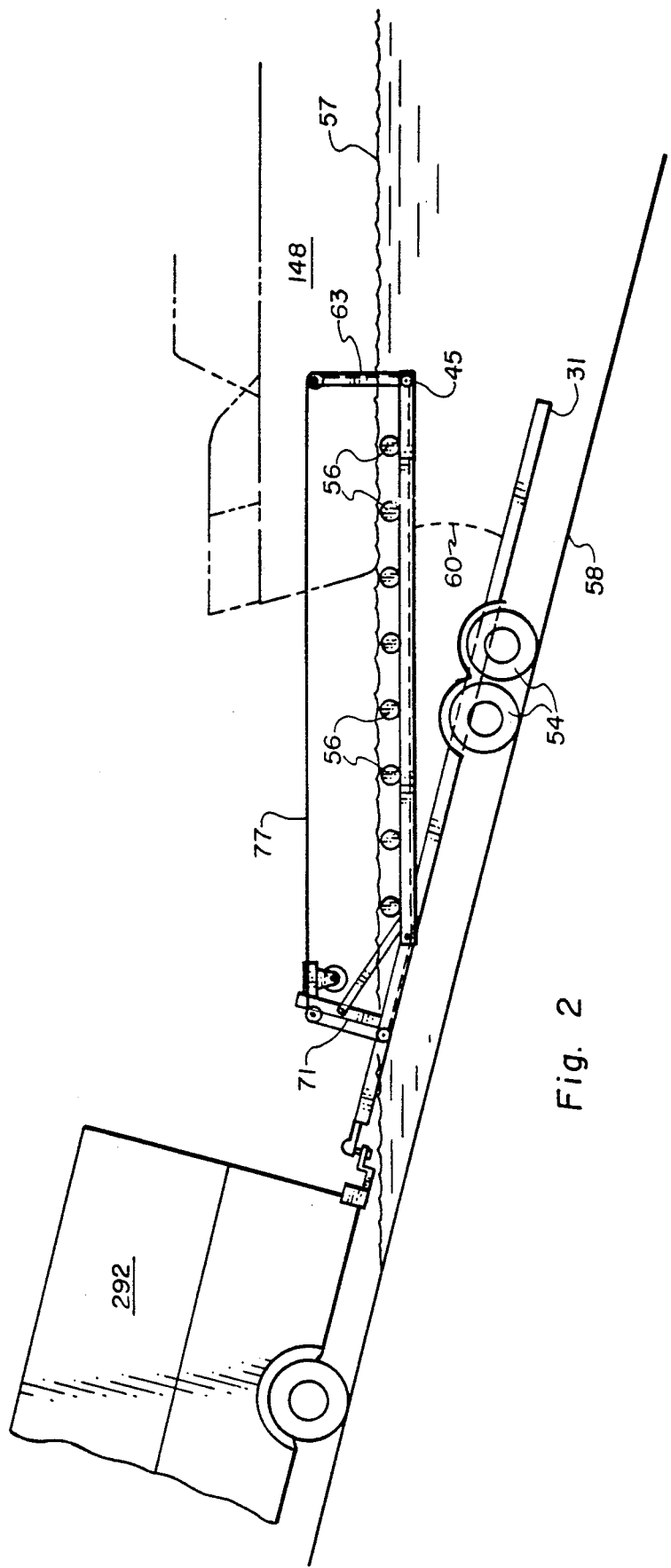
FIG. 2 is a side view of a truck mounted trailer of the type illustrated in FIG. 1 wherein buoyant members secured to the subframe have elevated that subframe upon the trailer's entry into a body of water.

The number and size of the buoyant blocks 56 are calculated by determining the weight of the shafts 45 and then determining the size and composition of buoyant material required to create a hydrostatically-induced buoyancy force sufficient to counteract the submerged shaft weight. As shown in FIGS. 1 and 2, buoyant blocks 56 are illustrated as cylindrical members mounted on the uppermost top surface of each shaft 45. Observably, other buoyant block configurations and locations of those blocks on the shafts 45 may be adopted to achieve the same function and operation.

One guide means 29 of the invention is illustrated in the embodiment of FIGS. 1, 1A and 2. In this embodiment, a hollow upright stanchion 63 is mounted on the free end of each of the shafts 45. A hollow channel in each stanchion 63 communicates with a hollow channel, defined within the association of the shaft 31 and shaft 45, by means of an aperture defined within the top surface wall of the shaft 45.

The maximum angle 60 through which the shafts 45 may be elevated may in part be controlled by the configuration of the cut-away slot-like section 62 of the top section of shaft 45.

A pulley 67, having a generally hourglass-like exterior configuration, is horizontally and rotatably mounted within the hollow channel of each stanchion 63 by a horizontally positioned axle 69 which is received within registered openings defined in the sidewalls of the stanchion 63. The pulley 67 shown generally in FIG. 4 is adapted to permit a plurality of cable orientations thereover as the cable is displaced over the pulley.

A stanchion 71 is rigidly mounted upright on shaft 41 proximate the mounting of shafts 37 on that shaft 41. The stanchion 71 is fitted on opposite sides thereof proximate its upper end with a pair of rotatably mounted pulleys 73. Each pulley 73 is mounted to the stanchion 71 by an axle which extends through that stanchion.

A second pair of pulleys 75 is mounted on opposing sides of the shaft 41 proximate the mounting of the stanchion 71 on shaft 41. Each of the pulleys 75 are oriented to register with a respective pulley 73.

A first cable 77 is attached at its first end to a ring-like member 78 and is trained over pulley 73 and then directioned downward along the height of stanchion 71 to be received and trained over pulley 75. The first cable is then directioned through the open end 39 of shaft 37 and through the hollow channel of that shaft 37.

Figure 5:
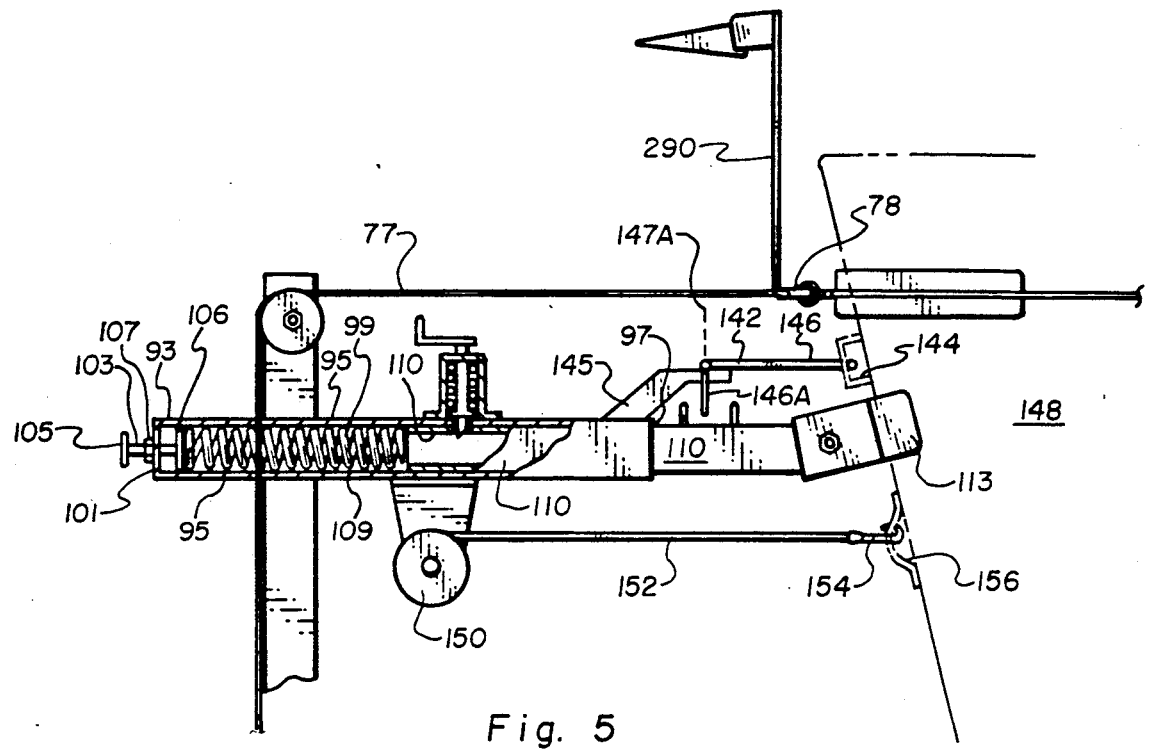
FIG. 5 is a partial side view of the upright stanchion of the trailer shown partly in cross section.

The cable 77 then passes through the hollow interior channel of the association of shaft 31 and shaft 45, eventually reaching a pulley 79 which is rotatably mounted on an axle 81 secured to the sidewalls of shaft 45. The cable 77 is trained about pulley 79 and thereafter directed upwards through the hollow interior channel of stanchion 63. The cable 77 is then trained about pulley 67 and thereafter is directed toward stanchion 71. The cable is fastened on its second end to a ring coupling 83 which is slidably mounted on ring-like member 78. In a preferred construction, the ring 78 is threaded through a centrally disposed opening in ring 83 whereby that ring 83 is free to slide along the length of ring 78 between two brackets 85 mounted on that ring 78 to extend outwardly therefrom. As shown in FIGS. 1 and 5, each of the brackets 85 define an opening therein dimensioned to slidably retain a ring-like fastening member 87. One such ring member 87 is attached to the first end of the cable 77.

Figure 8:
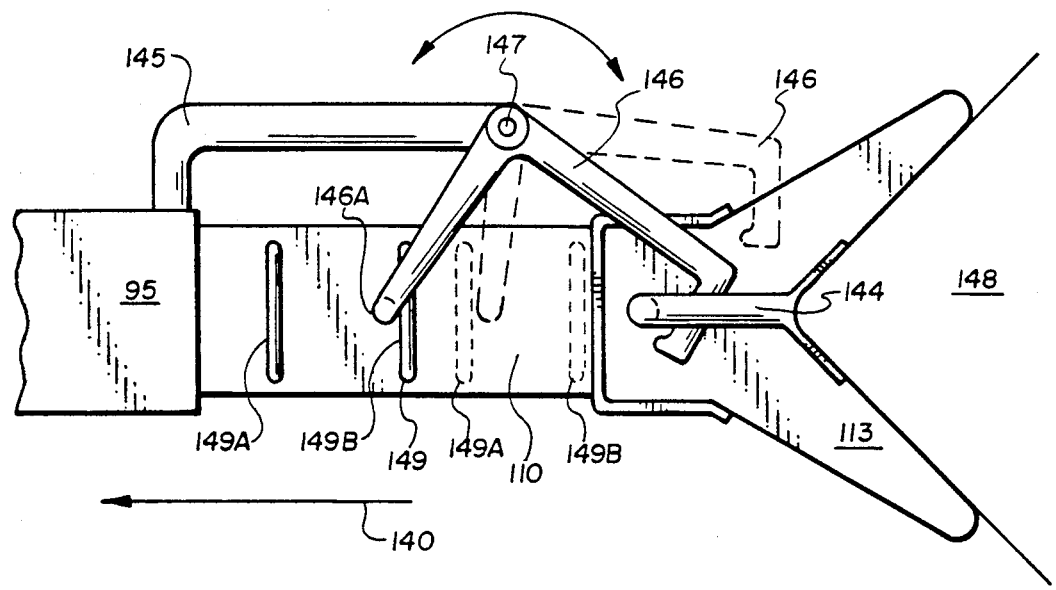
FIG. 8 is a top view of an alternative embodiment of an abutment member of the trailer guide means.

The movement ability of the rings 83 about ring 78 is shown by the phantom renderings of rings 83 and cable 77 in FIG. 8.

The cable 77 may be fitted proximate its mounting onto ring 83 with an abutment pad 89, dimensioned to abut against the bow of a boat retained on the trailer and thus hinder, if not avoid, the potentially abrasive or otherwise damaging contact of the cable 77 directly against the boat. The cable 77 may be covered by a plastic coating.

A second cable 77A is positioned in a symmetrical orientation to cable 77 on the opposite side of the trailer as illustrated in FIG. 1. Cable 77A likewise includes an abutment pad 89.

The association of the two cables 77 and 77A form a generally "V"-shaped guide adapted to receive an incoming boat and direct that boat into an aligned positioning on the trailer. The ring 78 is displaced along with the boat, both as the boat is launched as well a when it is loaded. As the ring 78 is displaced along the length of the trailer, the interior angle 91 defined by the "V"-shaped cable arrangement increases in angle degree measurement as the ring 78 is displaced toward the rear end of the trailer. Conversely, that angle measure decreases in degree measurement as that ring is displaced toward the front of the trailer. When the ring approaches the rear of the trailer, the angle 91 approaches 180°. Understandably, as the ring 78 is displaced along the trailer, the cables 77 and 77A likewise are displaced over their respective pulleys.

FIG. 3 illustrates a modified construction of the cable arrangement shown in FIG. 1. In this modified construction a single cable 77C is mounted to the ring 78. The single cable 77C is directed over a single pulley 76 mounted on stanchion 71. The cable 77C is likewise trained over a single pulley 76 mounted on frame member 41. The cable 77C is fitted with a tensioning member mounted therein which is illustrated in FIG. 3 as a coil spring 92. The cable 77C is mounted on its end by a ring coupling member 83A to a ring 78A, which ring and coupling member are structurally similar to ring 78 and ring coupling member 83. Two cables 77D and 77E are each connected to ring 78A by ring coupling members 83B which are identical to ring coupling member 83. Each of the cables 77D and 77E are trained over a respective pulley 79 and thereafter directed upwardly through a respective stanchion 63. Thereafter, each cable is trained over a respective pulley 67 and thereafter directed to a ring coupling member 83 fitted mounted to ring 78.

Also mounted on stanchion 71 is a laterally extending, biased abutment member 93. As shown more detailedly in FIG. 5, the abutment member 93 includes a housing 95, having an open end 97 which communicates with a hollow interior channel 99 extending along the length of the housing 95. The opposing end of the housing is covered by endwall 101. That endwall 101 defines an aperture therein through which is inserted a shaft 103. Shaft 103 is fitted on its one end with a handle 105. On its opposite end (the end contained within channel 99), an abutment plate 106 is affixed thereto. The shaft 103 includes a plurality of male threads along a portion of a length thereof. A female threaded nut 107 is fixedly mounted on endwall 101. The shaft 103 is threadedly inserted through the nut 107 to provide an adjustable means of controlling the positioning of the plate 106 in channel 99.

A coil spring 109 is positioned within channel 99 such that its first end is in abutment against plate 106. A piston 110 is slidingly inserted into channel 99 to abut against the opposing end of spring 109. Piston 110 extends outwardly from the housing 95 and is mounted on its free end with a "V"-shaped abutment plate or cradle 113, configured to mate with the bow of a boat as shown to advantage in FIG. 8. As illustrated in FIG. 5, the piston 110 is a generally hollow elongate member having an aperture 112 in its top surface configured to receive a locking pin 114 of a manual locking means, generally 116.

Locking means 116 includes a housing 118 having a hollow channel 120 therein. The housing 118 is mounted upright on housing 95 by bolts 121 to register the channel 120 with an aperture 122 in the sidewall of housing 95 and, furthermore, with the aperture 112 in piston 110. A pin 114 having a collar 124 fixedly attached thereto is mounted rotatably within the channel 120. Pin 114 extends through a coil spring 126 mounted within channel 120 whereby the spring abuts against the housing 118 endwall on its first end and against the collar 124 on its opposing end to retain the pin positioned through the apertures 112 and 122. Collar 124 is shown dimensioned to preclude its passage through aperture 122. Pin 114 extends outward through an opening in the endwall of housing 118 and mechanically cooperates with a laterally extending handle 130. As shown, handle 130 is manually graspable by the user to rotate pin 114 about a vertical axis 132. As shown, the handle may be secured to the pin 114 by a nut and washer arrangement 134 which is threadedly inserted over a male threaded shaft extending upwardly from the top of pin 114. The nut and washer arrangement 134 secures the handle 130 against a shelf-like portion of pin 114.

The pin 114 is configured as a cylindrical member having an angulated planar face 137 on its free end. The pin 114 is configured such that in the orientation shown in FIG. 5, the pin securely locks the piston 110 in place vis-a-vis the housing 95. Any movement of the piston 110 in the direction indicated by arrow 138 causes the abutment of the aperture defining sidewall 139 to come into a non-sliding abutment against the vertically oriented sidewall of the pin 114.

Upon the rotation of the pin 114 about its axis by 180°, the angulated planar face 136 is brought into abutment against the sidewall 139 which upon a movement of piston 110 in the direction indicated by arrow 138 causes the pin to be inserted upward into its housing 118 permitting the piston 110 to be displaced laterally in the direction indicated by arrow 138.

Understandably, when the pin 114 is in the orientation shown in FIG. 5, a displacement of the piston 110 in the direction indicated by arrow 140 causes the pin 114 to be pushed upwardly into its housing 118, while the endwall 142 of piston 110 pushes against coil spring 109. The arrangement provides a cushioned, spring biased abutment cradle adapted for receiving the incoming bow of a boat. The pin 114 in the position of FIG. 5 retains the piston 110 in place against the biasing action of the spring 109.

The housing 95 may also be fitted with a latch 142 adapted for cooperating with an eyelet bracket 144 mounted on the boat 148 for forming a union of the boat 148 and the stanchion 71. Latch 142 functions as a safety latch to retain the boat fixed relative to the trailer.

Latch 142 includes an extension 145 fixedly mounted on housing 95 and extending outwardly therefrom. As shown in FIG. 8, an "L"-shaped arm 146 is pivotely mounted to extension 145 by a vertically positioned pivot pin 147. The arm 146 is adapted for rotation in a horizontal plane about a vertical axis 147A. One end of the arm 146 is formed with a downwardly extending finger 146A, which finger is positioned between two upstanding contact plates 149 mounted on piston 110. In the piston rest position, the rearmost plate 149 abuts against the finger 146A and urges the arm 146 into the orientation shown in phantom in FIG. 8. In this orientation, the end 146B of the arm 146 which is formed into a hook-like configuration, is free and held out of contact with boat 148. When an incoming boat 148 abuts against the abutment plate 113 fitted on the end of piston 110 and urges that piston 110 in the direction indicated by arrow 140 against the action of spring 109, the contact plate 149B is displaced in the direction of arrow 140 and eventually contacts arm finger 146A and causes a clockwise rotation of the arm 146 about its pivot axis, thereby bringing the hook-like end of that arm into a locking relationship with the eyelet bracket 144 mounted on the bow of boat 148. This locking orientation is shown in the solid line representation of the arm 146 in FIG. 8. The latch 142 performs an initial locking function for retaining the boat 148 in position on the trailer. A winch 150 and cable 152 arrangement function as a more secure restraining system for retaining the boat 148 on the trailer during the over-land transport of the boat.

Figure 6:
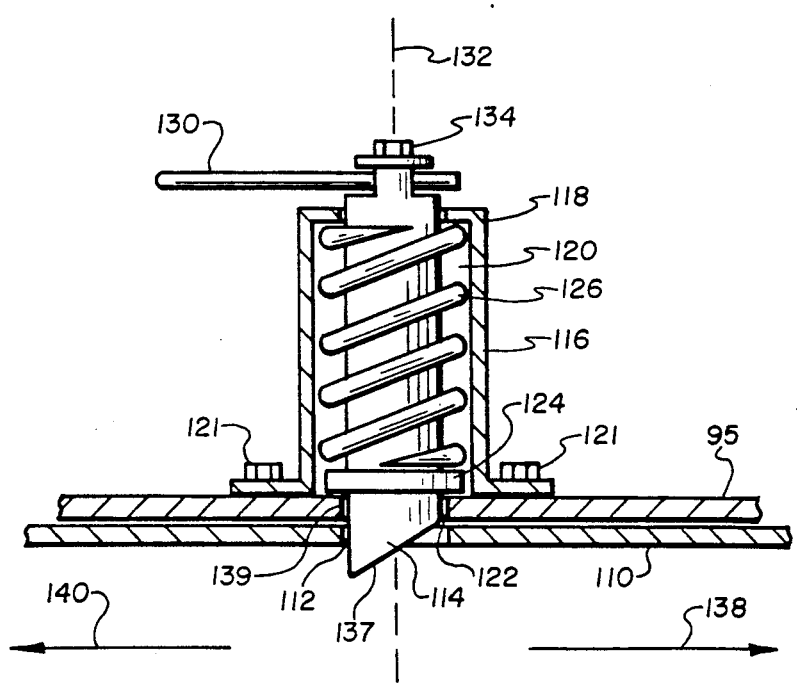
FIG. 6 is a cross-sectional side view of the locking mechanism of the stanchion illustrated in FIG. 5.
Figure 7:
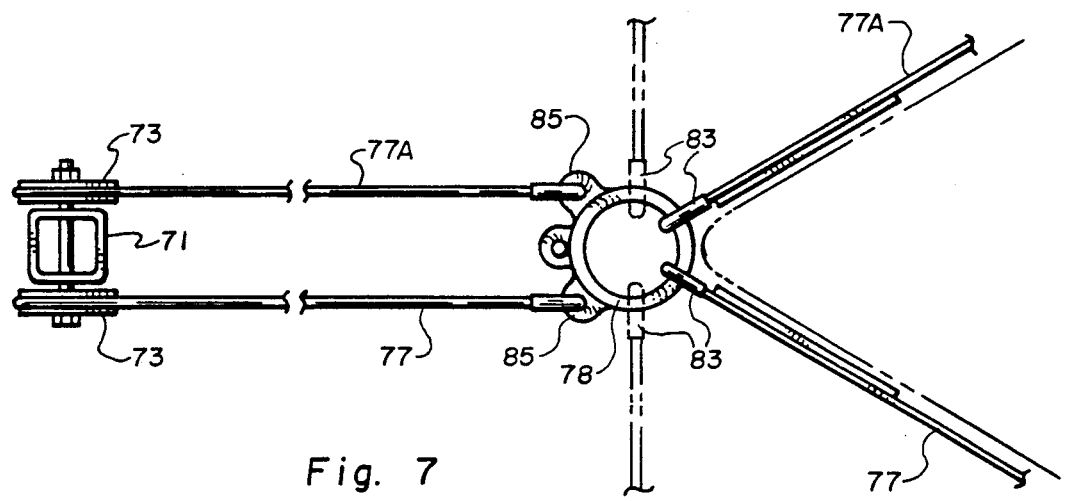
FIG. 7 is a top view of a first embodiment of an abutment member of the trailer guide means.

During the unloading operation, the handle 130 is rotated 180°, bringing the angled end of the pin 114 into an orientation which permits movement of piston 110 in the direction indicated by arrow 138, i.e., the pin orientation is rotated 180° from that shown in FIG. 6. With this pin 114 orientation, as the boat 148 is driven in the direction of arrow 138 by its motor, the piston 110 due to the locked latch 142 and the action of spring 109 is driven outward from housing 95 in the direction indicated by arrow 138. As that piston is displaced outward the contact plate 149A comes into contact with the finger 146A. A continued displacement of piston 110 causes the contact plate 149A to drive the arm 146 into the unlocked orientation shown in phantom in FIG. 8.

Once the handle 130 is set in either its locking or unlocking orientation, the operation of the latch 142 permits a user to position himself at the boat controls and either drive the boat off of the trailer or drive the boat onto the trailer. In each instance, the latch 142 respectively unlatches itself from the boat, or alternatively, latches itself to the boat.

A winch 150 may also be mounted on housing 95. As shown in FIG. 3, a cable 152 from the winch may be fitted with a hook 154 which cooperates with a second eyelet bracket 136 mounted on boat 148. Winch 150 may be used to tow the boat onto the trailer from the water.

FIGS. 9 through 14 illustrate alternative latching devices for use in connecting the cables 77 and 77A to the boat 148.

Figure 12:
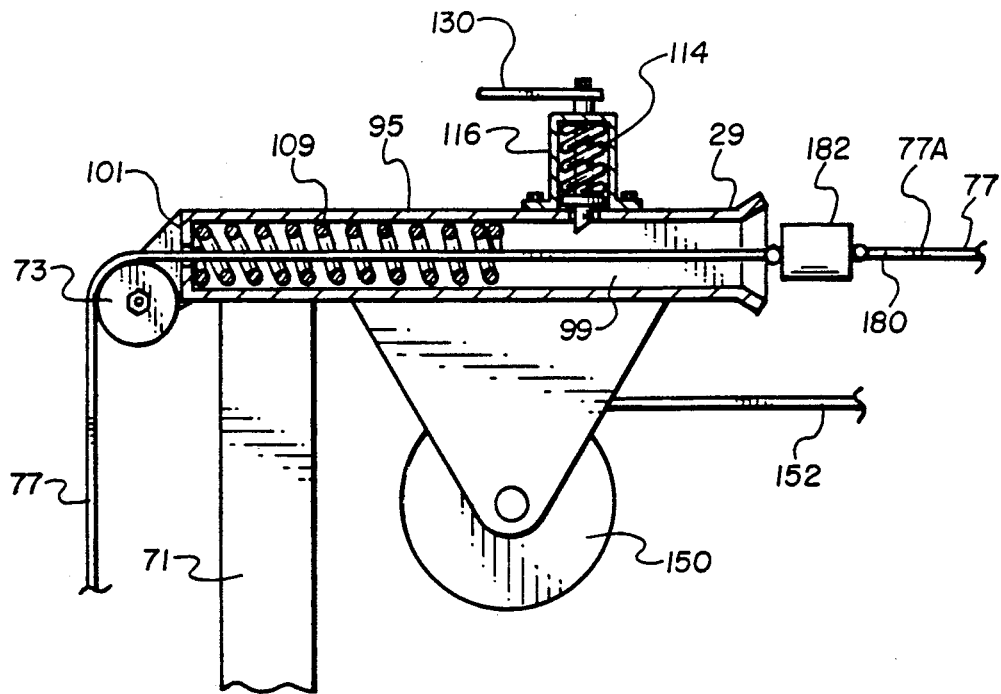
FIG. 12 is a cross-sectional side view of an alternate upright stanchion member.

In FIG. 12, the ring 78 has been replaced by a housing 158 which defines a rectangularly cross-sectioned, open ended hollow interior channel therein. The cables 77 and 77A are respectively connected to the housing 158 by means of aperture defining, laterally extending brackets mounted to the housing sidewalls. Ring-like members 160, which each pass through the aperture of a respective bracket, form a sliding connection means.

A bracket 162 having a shaft-like extension thereon is mounted on the bow of the boat 148, e.g., by screws 163, as shown. The shaft-like extension is configured to be received within the hollow channel of housing 158. The housing 158 and bracket may utilize a magnetic connection, wherein the housing 158 and/or bracket 162 are fabricated of permanent magnetic-type materials.

Figure 13:
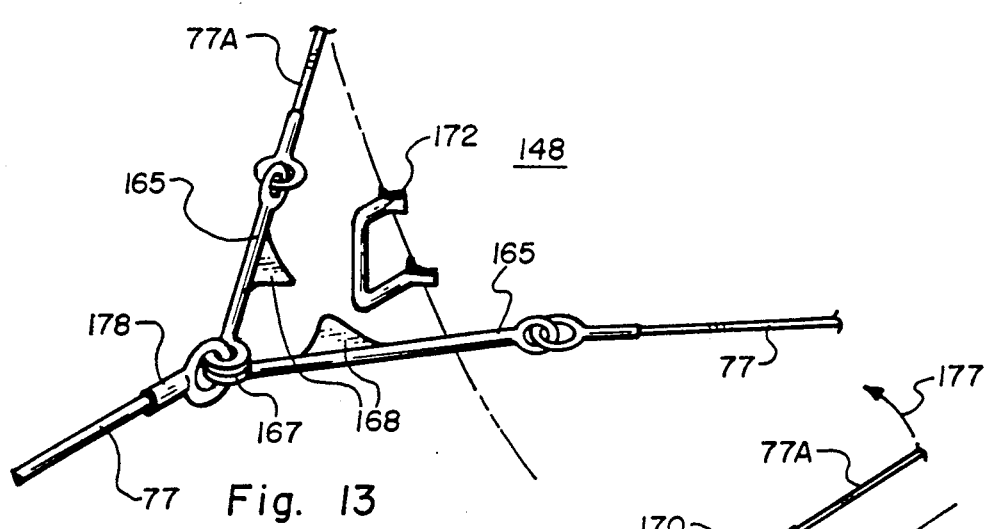
FIG. 13 is a perspective view of an abutment member of the trailer guide means.
Figure 14:
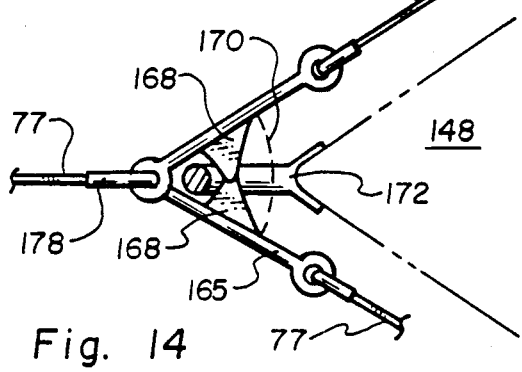
FIG. 14 is a top view of the abutment member shown in FIG. 13.

FIGS. 13 and 14 illustrate a connection means wherein a pair of jaw-like arms 165 are pivotally mounted to one another at their ring-configured ends 167. Each arm 165 is fitted with a triangularly shaped member 168. The arms 165 form a generally "V"-shaped arrangement and define an interior angle 170 therebetween. As the arms 165 are displaced toward the forward end of the trailer, the interior angle 170 is decreased in angle measure causing the triangular members 168 to be brought closer to one another until eventually the members 168 cooperate in extending in an overlapped manner through the eyelet formed by a bracket 172 mounted on the boat 148. As shown to advantage in FIG. 13, the arms 165 are held together by a ring-like member 178 mounted on cable 77 which extends through the ring-like end pieces of the arms 165. As the arms 165 are displaced toward the rear end of the trailer, the interior angle 170 increases in angle measure and the arms are rotated outward in the directions indicated by arrows 177 until eventually the bracket 172 is freed.

FIG. 12 illustrates the use of a block and cable arrangement 180 as a means of forming a guide means 29. In this embodiment, the cables 77 and 77A are mounted at their ends to a block member 182 dimensioned to be slidably received within channel 99. The block 182 is fastened at its opposing end to the first end of cables 77 and 77A which have been threaded through an aperture in the endwall 101 of housing 95 and thereafter through the coil spring 109. Pulley 73 has been relocated on the stanchion 71 so as to align the cables 77 and 77A with the aperture 101. In this aforedescribed embodiment, the guide means 29 has been combined with the latching means as illustrated in FIG. 3 to provide a unitary system. The operation of the pin 114 is similar to the embodiment described above with reference to FIG. 5, with the exception that the pin 114 acts against the ends of block 182 as opposed to being inserted into an aperture 112 in piston 110.

Figure 10:
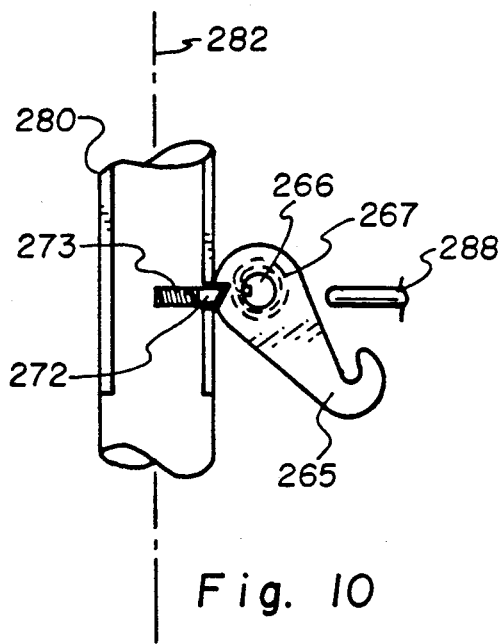
FIG. 10 is a cross-sectional side view of a latch means of the invention shown in an open position.
Figure 11:
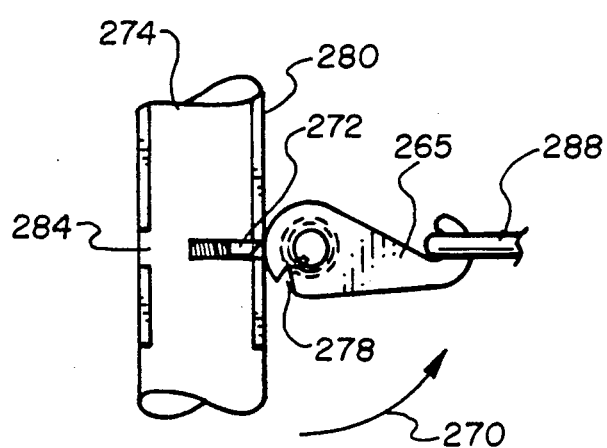
FIG 11 is a cross-sectional side view of the latch means of FIG. 8 shown in a closed position.
Figure 15:
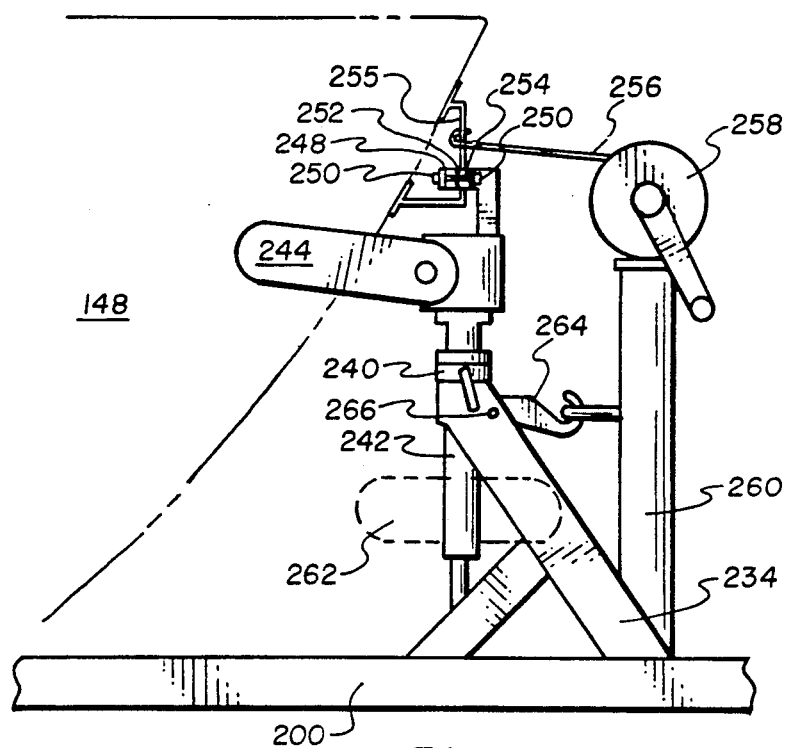
FIG. 15 is a sectional side view of an alternative boat trailer embodiment of this invention.

FIGS. 15–18, in association with FIGS. 10 and 11, disclose an alternative embodiment of the boat trailer. This embodiment includes an elongate frame having a pair of elongate, spacedly and parallelly positioned, frame members 200. A plurality of cross-braces 202 are mounted at their first ends to frame member 200A and at their second ends to frame member 200B and thereby extend between the frame members 200 to rigidly associate those frame members 200 with each other. The cross-braces 202 are positioned spacedly apart from one another along the length of the frame members 200. An elongate side frame rail 204 is mounted to each frame member 200 to extend along the length of the trailer. As shown in FIG. 15, the side frame rail 204 includes a generally elongate beam 206 having two or more supports 208 which extend vertically from the respective frame member 200 to support the beam 206.

Each of the side frame rails is fitted with one or more guide rollers 210 structurally comprised of an elongate roller mounted on an axle journaled into two brackets which extend outwardly from the siderail 204. A plurality of guide rollers may be positioned spacedly along the length of each side frame rail 204 to provide a means of guiding an incoming boat onto the trailer. The guide rollers 210 are laterally positioned spacedly apart from one another to permit the passage therebetween of boat 148.

Figure 16:
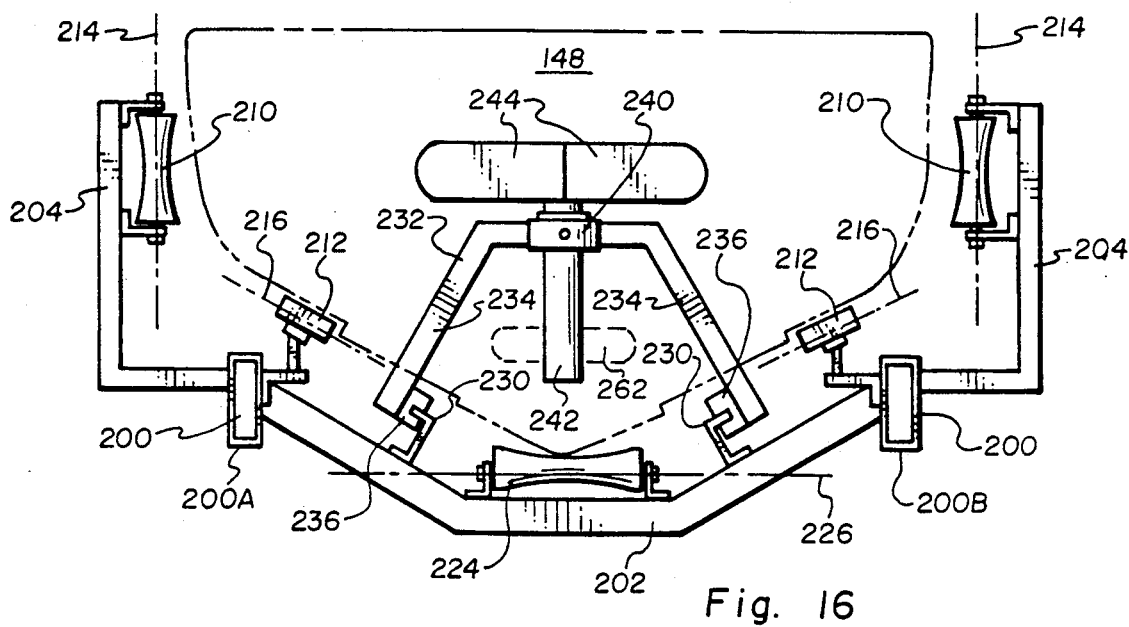
FIG. 16 is a front end view of the trailer of FIG. 15.
Figure 17:
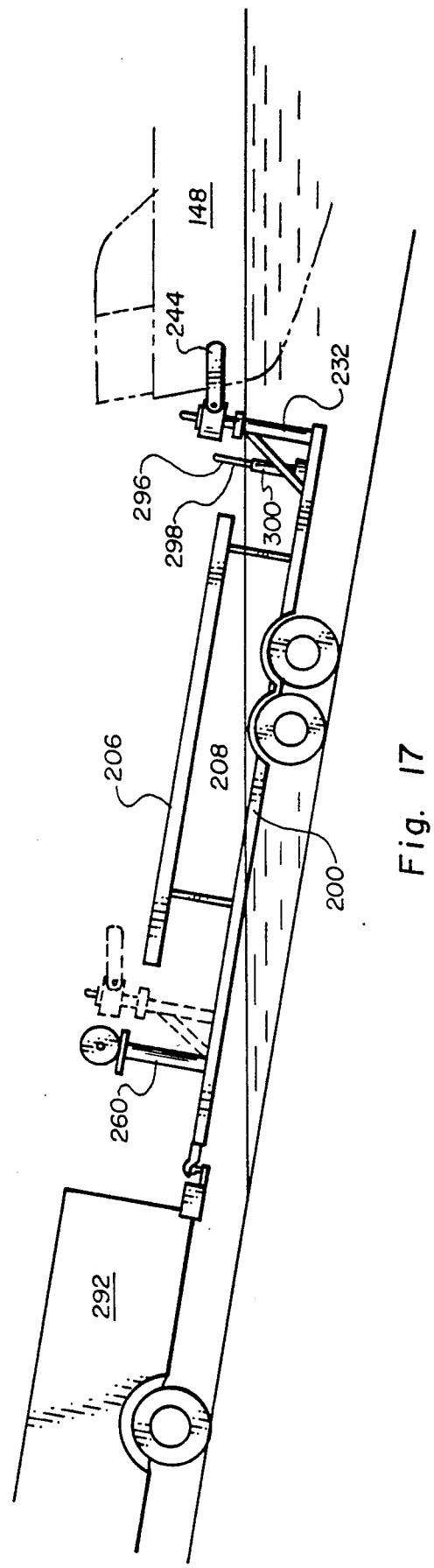
FIG. 17 is a side view of the trailer of FIG. 15 shown on an inclined ramp partially submerged in a body of water. The trailer is shown being towed by a truck.
Figure 18:
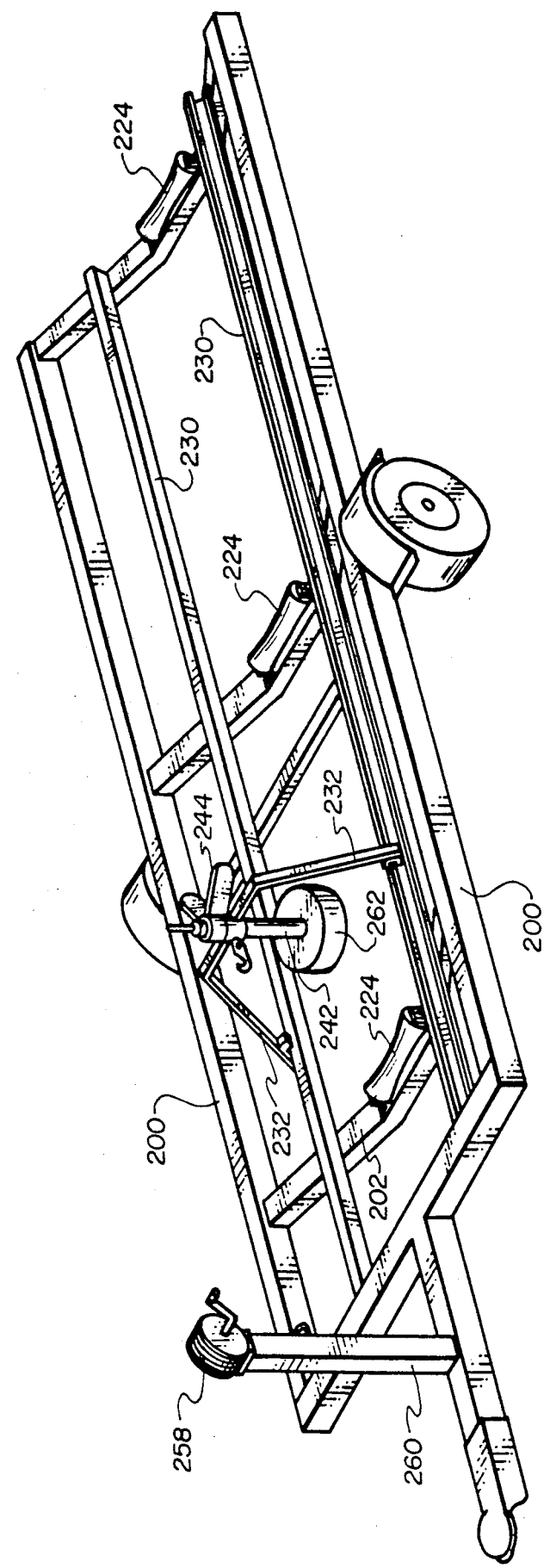
FIG. 18 is a perspective view of the alternative boat trailer embodiment of FIG. 15 wherein the side support rails have been removed for clarity.

A second plurality of guide rollers 212 may be mounted on the two frame members 200. As shown in FIG. 16, each of these rollers 212 likewise includes a roller mounted on an axle journaled into a support frame, which frame is mounted on the frame member 200. Whereas the guide rollers 210 are adapted for the roller's rotation about a vertical axis 214, the rollers of guide rollers 212 are adapted for rotation about axes 216, which appear to be angulated from the horizontal. The guide rollers 410 in association with the guide rollers 212 provide a means of guiding the boat 148 by abutting against the sides of the boat 220 (guide rollers 210) and against the inwardly sloping hull 222 of the boat (guide rollers 212).

A third plurality of guide rollers 224 each having a roller mounted to an axle journaled into two support brackets is mounted to the plurality of cross-braces 202. As shown, a guide roller 224 is mounted centrally on each cross-brace 202 whereby its roller rotates about a horizontally oriented rotational axis 226. The guide rollers 224 may be spacedly positioned along the length of the trailer to provide a spaced bottom support for the keel 228 of the boat 148.

A pair of elongate guide rails 230 are mounted to extend parallel one another along the length of the trailer. These guide rails, each having a generally "U"-shaped cross section, are mounted to the plurality of cross-braces 202. As shown in FIG. 16, each of the rails 230 is positioned such that the open side of the "U"-shaped cross section faces outward toward a respective side of the trailer. In association with one another, the two rails 230 form a two-member guide track for a carriage 232 mounted thereon. FIGS. 15 and 16 illustrate a carriage 232 having a pair of outwardly extending legs 234 which each engage a respective guide rail 230. Each leg includes a block-like member 236 defining therein a slot configured to receive a flange or lip of a respective guide rail 230. The block-like member 236 is adapted for sliding displacement along the length of the guide rail 230. In an alternative construction, the block members 236 may be replaced by a pair of rollers positioned opposite on another and spaced apart sufficient to receive therebetween a respective flange of the guide rail 230. In this alternative embodiment, the rollers form a means of guiding the carriage by use of rolling members (i.e. rolling friction) as opposed to the sliding block-like members 236.

Each of the leg members 234 are fixedly mounted to a support 240, having a centrally defined opening therein which slidably receives a vertically upright shaft 242. Stated otherwise, the support 240 forms a collar for an uprightly mounted shaft 242.

Shaft 242 includes a pair of outwardly extending planar panels 244 which are oriented to form a generally "V"-shaped array. The panels 244 are oriented to form a cradle configured to receive the bow of a boat 148. As shown, the extension is generally "C"-shaped in configuration. Each arm of the "C"-shaped extension includes two outwardly extending parallel arms 249 mounted thereon, which arms individually define a female threaded aperture therein. A male threaded bolt 250 is threadedly inserted into each arm aperture and is adjustably held in place within its respective aperture by a locking nut 250A. A lock arm 251 is pivotedly mounted to each arm of the "C"-shaped extension 248 by a pivot pin 252. Each lock arm 251 is adapted for rotation within a horizontal plane about a vertical rotational axis 252A defined by the structure of the pivot pin 252. Each lock arm 251 defines a finger 251A which extends outward into the space between each pair of parallel arms 249. An outwardly projecting shaft 253 is mounted on each of the two opposing vertical faces of the finger 251A. A spring 254 is mounted on the shaft of each bolt 250 and further mounted over a respective shaft 253 of a finger 251A.

Figure 19:
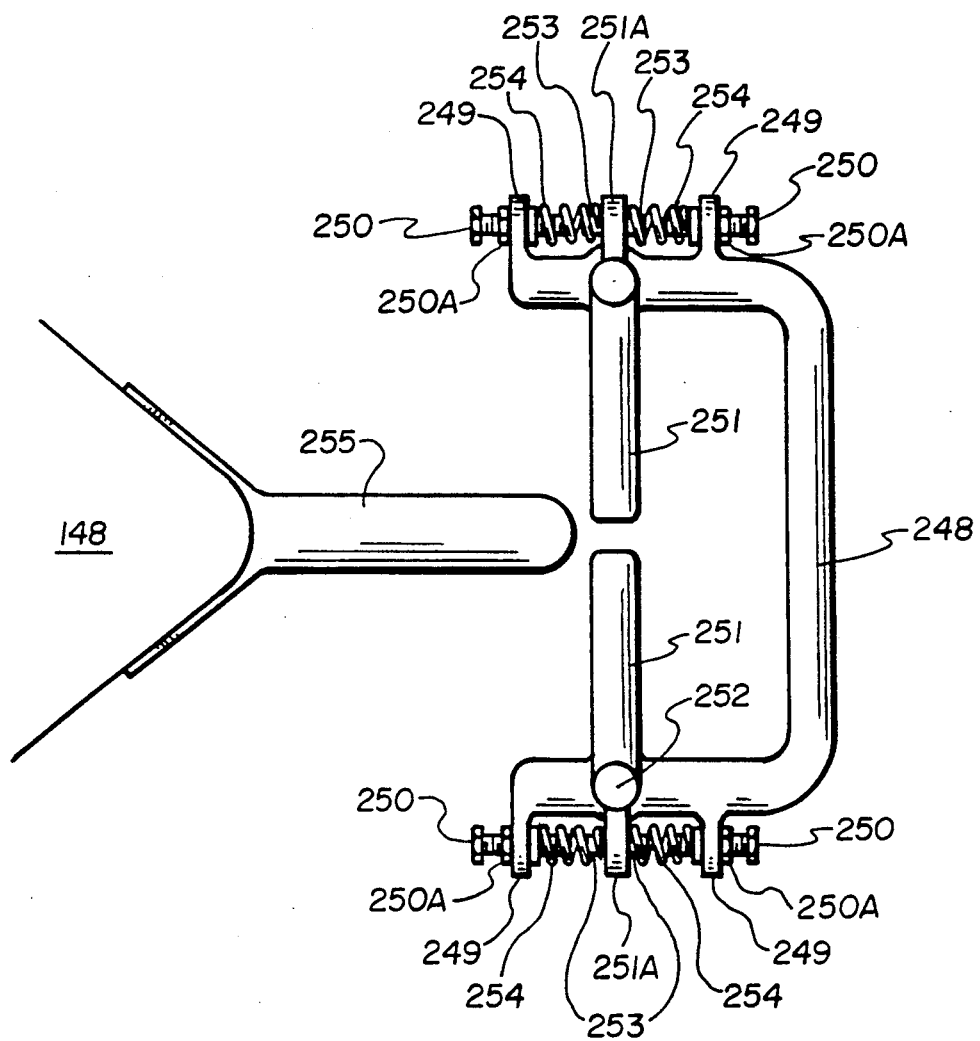
FIG. 19 is a top view of the latch mechanism shown in FIG. 15.

As shown in FIG. 19, each of the two arms 251 are held in a generally collinear rest orientation by the action of a respective pair of opposing springs 254 which abut the opposing sides of each arm finger 251. A retaining bracket 255 mounted on the boat 148 defines an aperture or eyelet therein which upon being urged against the arms 251 causes those arms to rotate about their respective pivot axes until the foremost portion of that bracket clears the arms 251. After being disengaged from bracket 255, the arms 251 are rotated in a direction counter to the direction of their initial rotation by the springs 254 compressed during the arm's initial rotation. This counter rotation brings the arms into a locking position within the eyelet of bracket 255. The spring constant of the springs 250 is sufficient to retain the arms 251 in their locking orientation, i.e., positioned to extend within the eyelet of bracket 255 as the boat 148 is driven off the trailer by the action of its motor. Due to the locking action of the arms 251, the carriage 232 is pulled, by the boat's being driven off the trailer during unloading, along the length of the trailer. When the carriage 232 reaches the end of its guide track 230, the rollers 276 of the carriage impact against abutment plates 277 mounted on the end of each respective guide track 230. Further displacement of the carriage 232 in the direction indicated by arrow 251 is precluded. A further application of force to the boat 148 by the action of its motor overcomes the spring constant dependent force generated by the springs 254 and causes those arms 251 to rotate outward in the direction indicated by arrow 259 until the bracket 255 is driven outwardly from its locked position within the extension 249.

Observably, the action of this locking means operates independent of any direct manipulation of the locking means by the user. The locking means permits a user to automatically lock the boat 148 to the carriage 232 and hence the trailer, by driving that boat onto the trailer, relying on the force applied indirectly to the locking means by the boat's motor. Furthermore, the locking means is disengaged automatically as the boat is driven off of the trailer.

Anchor bracket 255 also functions as a mounting for a retaining hook 254 mounted on a cable 256 which is trained about winch 258.

The winch 258 is mounted to an upright stanchion 260 mounted on a cross-brace 202.

Shaft 242 is fitted on its lower end with a buoyant member 262 which is fabricated from a low-density material which floats when placed in water, i.e., the member 262 has a specific gravity of less than 1. The buoyant member 262 is adapted to urge shaft 242 upwardly through the collar formed by support 240 upon the carriage 232 being driven into water. Shaft 242 is elevated sufficiently to bring the guide members 244 into contact with an incoming floating boat.

A latch 264 may be fitted to collar support 240 for purposes of securing the carriage 232 to the upright stanchion 260. This securement is useful in providing a means of securing the boat 148 to the trailer while the trailer is transported over land. In the configuration shown in FIG. 13, the winch 258, cable 256 and hook 254 arrangement form one securement means of locking the boat to the trailer, while the carriage 232 in association with latch 264 forms a second securement means.

As shown to advantage in FIGS. 10 and 11, the latch 264 includes a hook member 265 which is journaled on an elongate shaft 266 fixedly mounted at its opposing ends to the leg members 234 of carriage 232. The hook 265 being rotatable about shaft 266 is biased by a spring 267 which is fixed at its first end to shaft 266 and at its second end to hook 265. The spring is oriented to urge hook 265 in the direction indicated by arrow 270.

A pin 272 having a beveled end is mounted within an elongate channel 273 of an extension 274 of support 240. Pin 272 is adapted to detachably lock the hook 264 in an open orientation. As shown in FIG. 10, pin 272 is urged outwardly from its recess channel 273 by a compressed spring 276 positioned within that channel. Hook 264 defines a notch 278 therein configured to receive and engage the beveled head of the pin 272, and thereby form a detachable locked union of the pin 272 and latch hook 265.

Figure 9:
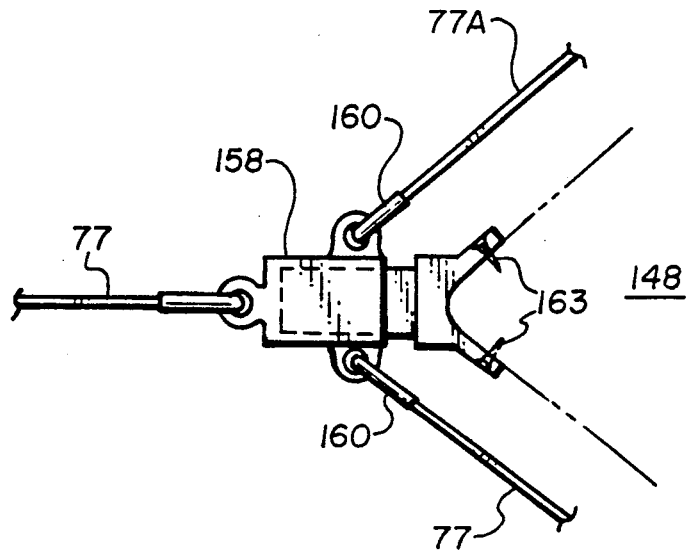
FIG. 9 is a top view of a third embodiment of an abutment member of the trailer guide means.

A cylindrical outer jacket 280 is mounted about extension 274. The jacket 280 is configured to be rotatable about extension 274 and about vertical axis 282. Jacket 280 has a solid sidewall which defines a slot 284 therein positioned to permit the passage therethrough of pin 272. Jacket 280 is fitted with a handle for assisting the user in rotating it. FIG. 8 illustrates the jacket 280 being positioned such that slot 284 is oriented for passage therethrough of pin 272. In contrast, FIG. 9 shows the jacket 280 rotated to bring the solid wall of the jacket over the pin 272, thereby urging that pin 272 back into its recess channel 273. In this latter orientation, the spring 267 urges the hook 265 in the direction indicated by arrow 270, thereby causing that hook 265 to engage with the eyelet-type bracket 288 forming thereby a locked engagement.

The spring 267 has a spring constant adapted for permitting a user to manually depress the hook 265 and thereby disengage the hook 265 from bracket 288. Upon a rotation of jacket 280, the pin 272 may be brought into engagement with notch 278 to retain the hook 265 in an open position.

In operation, the latch 264 is substantially automatic. As shown in FIG. 10, upon the jacket 280 being oriented to permit the passage of pin 272 through slot 284, the hook 265 is held in an orientation which precludes its engagement with eyelet bracket 288. When the jacket 280 is rotated to confine the pin 272 within its recess well, the hook 265 is urged in the direction of arrow 270 by spring 267. As the hook 264 is displaced toward eyelet bracket 288, that bracket initially depresses the hook 265, as the bracket contacts the curved section of the hook 265. After further displacement, the bracket clears that curved section, and the spring 267 urges the entire hook member 265 in the direction of arrow 270, thereby latching the hook 265 with the bracket 288 as shown in FIG. 11.

The ring-like member 78, as well as the alternative cradle-like structures disclosed herein, may be fitted with a guide flag 290 of the type shown in FIG. 5. The flag 290 is dimensioned to provide a visible indicator to both the driver of the boat as well as the driver of the truck 292 of the location of the cradle or ring member 78. The flag 290 is dimensioned to be visible over the superstructure of the boat 148, notwithstanding the submergence of the trailer in the water.

The trailer may also be fitted with a depth indicator 296 which is preferably mounted on the rearmost end of the trailer. Indicator 296 includes a shaft 298 which is marked with graduated markings corresponding to various water depth. The shaft 298 is made of a buoyant material and is mounted for slidable vertical displacement within a vertical housing 300. As the trailer enters the water, water enters the housing 300 and urges the shaft 298 upwards. Increasing water depth causes a further elevation of the shaft 298, thereby indicating the increasing depth of the trailer below the water surface. The indicator 290 is dimensioned to be visible from the truck 292.

Figure 20:
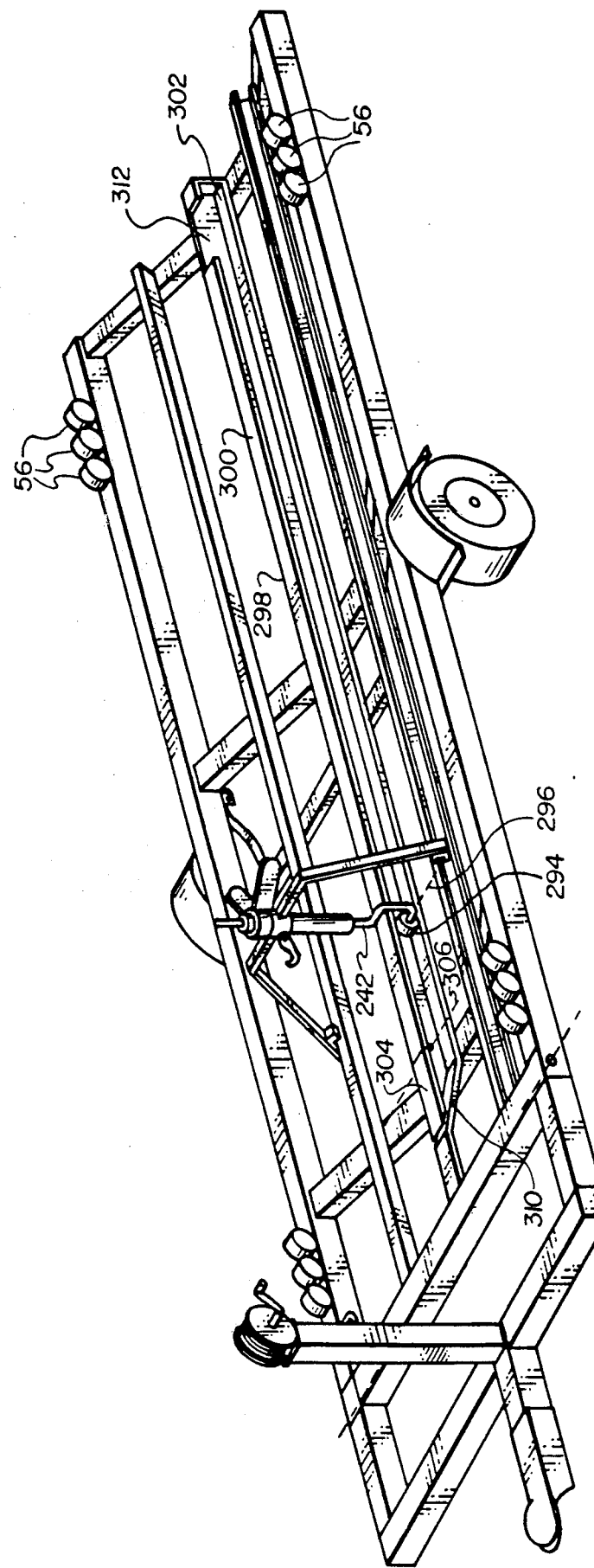
FIG. 20 is a perspective view of a third embodiment of the boat trailer. The side support rails thereof have been removed for clarity.
Figure 21:
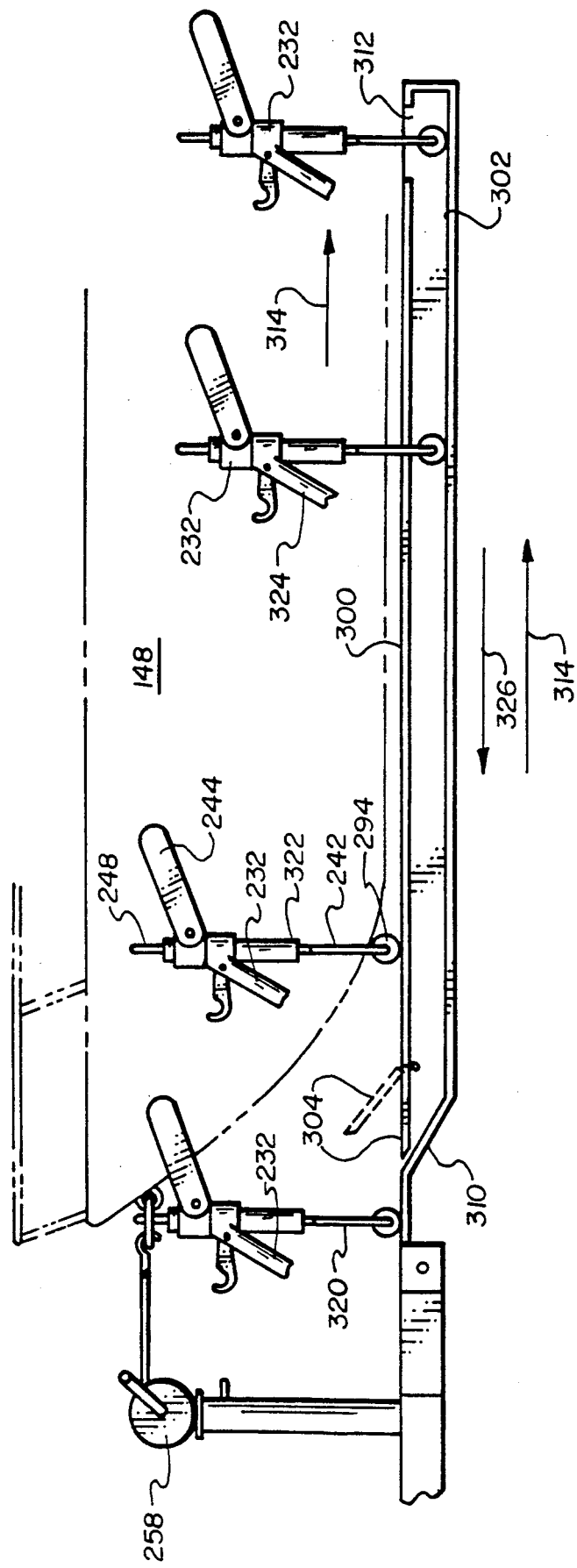
FIG. 21 is a sectional side view of the boat trailer of FIG. 20, illustrating various positionings of the displaceable carriage thereof.
Figure 22:
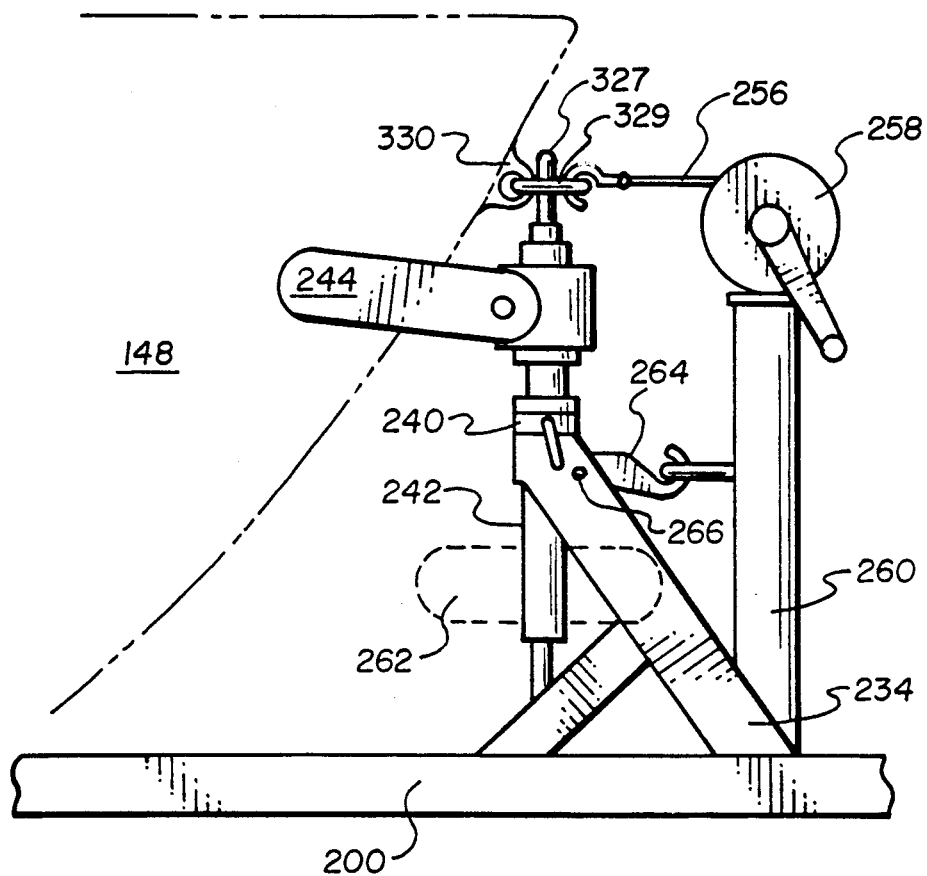
FIG. 22 is a partial side view of the trailer shown in FIG. 20.

FIGS. 20-22 disclose a modified construction of the boat trailer embodiment illustrated in FIGS. 15-19. In this construction the carriage 232 is modified by eliminating the buoyant member 262 as an actuating means. In place of that buoyant member 262, the shaft 242 is extended downward and formed at its end into a generally "C"-shaped configuration. A roller 294 is rotatably mounted in the end of the shaft 242 to be rotatable about a horizontal axis 296.

Roller 294 is positioned to be displaced along a dual-track guide means 298. As shown in FIG. 20, guide means 298 includes a generally "C"-shaped, elongate shaft which includes two planar, horizontally oriented tracks, respectively 300 and 302. Track 300 includes a subsection track 304 therein which is pivotedly mounted to the main section of the track 300 for rotation about a horizontal axis 306 in a generally vertical plane. As shown in FIG. 21, track subsection 304 is adapted for positioning in a vertical position (shown in a solid line representation) wherein the plane of the subsection is positioned coplanar with the plane of the track 300. The subsection 304 is adapted for a clockwise rotation in a vertical plane about pivot axis 306 to an orientation which defines an accessway whereby an accessory roller 294 may pass from the lower track 302 upward along an inclined region or ramp 310 of track 302, and the roller 294 may roll through track 300, thereafter onto track 300. The subsection 304 is configured such that its rotation may be activated by the abutment of roller 294 thereagainst during that roller's displacement along track 302.

Track 300 defines an open access way 312 proximate its end which communicates with the track 302 positioned therebelow. Accessway 312 is dimensioned to permit the passage therethrough of roller 294 whereby as the roller 294 is displaced along track 300 in the direction indicated by arrow 314, upon reaching accessway 312 the roller 294 drops vertically downward through that accessway 312 and is received on track 302.

The shaft 242 is configured to permit the displacement of the carriage 232 along track 302 in the direction indicated by arrow 316 in that the "C"-shaped region of that shaft 242 is configured to extend outward away from the track 300 and avoid any contact with the flange which forms that track 300.

FIG. 21 illustrates the carriage 232 in a progressive series of positionings along the two tracks 300 and 302. In the position identified generally as 320, the carriage 232 is shown with the boat 148 secured in its storage orientation on the trailer. The position identified generally as 322 corresponds with the initiation of the procedure of unloading the boat from the trailer. The carriage 232 has been displaced along a length of the track 300 in the direction indicated by arrow 314. In passing from position 320 to position 322, the track subsection 304 is positioned in its horizontal position (shown in a solid line representation) whereby the roller 294 rolls directly on and along the top surface of that subsection 304.

Upon continuing its displacement along track 300 in the direction indicated by arrow 314, the carriage eventually reaches accessway 312, at this point the shaft 242 and roller 294 arrangement passes through the accessway 312 (indicated generally in position 324). As the shaft 242 is displaced downward, rod-like member 248 is likewise displaced downward due to its mounting on shaft 242. Positioned on the top of the shaft 242 is an extension 248 which is shown to advantage in FIG. 22. The height of the downward displacement of roller 294 and hence of rod-like member 248, is adapted to cause that member 248 to be displaced sufficiently downward to disengage from circular ring 250 thereby releasing the boat 148 from the carriage 232.

Once the roller 294 is positioned on track 302, it is displaceable along that track in the direction of arrow 326. In typical use, the carriage 232 is displaced in the direction of arrow 326 by the action of an incoming boat 148 which is being loaded onto the trailer. During this loading operation, the panels 244 abut against the bow of the boat and form surfaces against which the boat can apply force sufficient to displace the carriage 232. Upon the roller 294 reaching ramp 310 and proceeding along that ramp, the roller pushes against subsection 304 causing that subsection to pivot as shown in FIG. 21 thereby opening an accessway for the roller 294 to roll upwardly onto the track 300 to the position shown generally as 320. As that roller 294 rolls along ramp 310, shaft 242 is driven upward through the collar of carriage 232, thereby driving the upmost section 327 of shaft 242 through the ring 329 mounted in the bow of boat 148 by bracket 330. The interrelationship of section 327 with ring 329 forms a locking mechanism for means of detachably linking the boat 148 to the trailer. Upon reaching the position 320 the carriage is now in its rest and lock position. As the boat 148 is unloaded and reloaded the above-identified cycle is repeated.

Those skilled in the art will recognize that the embodiments herein and discussed are illustrative of the general principals of the invention. The embodiments herein described are not intended to limit the scope of the claims which themselves recite what applicant regards as their invention.

What is claimed is:

1. A trailer for loading, transporting and launching a boat comprising:
    a first frame;
    a pair of wheels rotatably mounted to said first frame;
    guide means, mounted on said first frame, for guiding
        a water borne boat onto said frame, said guide means comprising;
        a subframe hingedly mounted to said first frame to be rotatable about a lateral axis,
        a plurality of upright stanchions mounted on said subframe,
        at least one upright stanchion mounted on said first frame, and
        at least one cable mounted to and connecting said stanchions to form a guide track for receiving a boat being loaded on said trailer;
    a buoyant member, mounted on said guide means, for elevating said guide means upon said trailer being driven into a body of water, said buoyant member being adapted for elevating said guide means to an altitude proximate a surface level of said body of water.

2. The trailer according to claim 1 wherein said guide means is "V"-shaped.

3. The trailer according to claim 2 wherein said first frame includes a latching means adapted for forming a connection of said frame with a boat.

4. The trailer according to claim 3 wherein said first frame includes a laterally extending housing, a contact member positioned within said laterally extending housing and a spring mounted within said laterally extending housing, positioned to bias said contact member outwardly from said laterally extending housing, said contact member adapted for providing a cushioned abutment member for said boat against said frame.

5. The trailer according to claim 4 wherein a compression of said spring is made adjustable by an adjustment means.

6. The trailer according to claim 1 wherein said first frame includes a latching means adapted for forming a detachable connection of said first frame with said boat upon an abutment of said boat against said latching means.

7. The trailer according to claim 1 wherein said guide means includes a pair of cables which are slidably connected to an annular member by ring-like connection fittings, said cables being displaceable vis-a-vis each other along said annular member.

8. The trailer according to claim 1 wherein said guide means includes a pair of cables which are both mounted to a common abutment means configured to receive a bow of an incoming boat and form a magnetically induced automatic union with a bracket fitting mounted on said boat.

9. The trailer according to claim 1 wherein said guide means includes a pair of cables, each of said cables includes a jaw-like arm mounted thereon, said arms being reciprocatingly pivoted one to another about a single end of each arm, each arm including a triangularly shaped extension, wherein a given rotation of said arms drives said extensions into an interlocking relationship adapted for grasping and retaining an eyelet fitted bracket on said boat.

10. The trailer of claim 1 wherein said stanchion on said first frame is fitted with a winch means for drawing said boat onto said trailer.

* * * * *

UNITED STATES PATENT AND TRADEMARK OFFICE
CERTIFICATE OF CORRECTION

PATENT NO. : 5,013,206

DATED : May 7, 1991

INVENTOR(S) : Guenter Ernst, et. al.

It is certified that error appears in the above-identified patent and that said Letters Patent is hereby corrected as shown below:

In column 5, line 21, change "3" to --31--.

Signed and Sealed this

Twenty-third Day of February, 1993

*Attest:*

STEPHEN G. KUNIN

*Attesting Officer*     *Acting Commissioner of Patents and Trademarks*